US012771457B2

(12) United States Patent
Verplaetse et al.

(10) Patent No.: US 12,771,457 B2
(45) Date of Patent: Oct. 20, 2026

(54) METHOD AND APPARATUS FOR SIGNAL CONDITIONING OF BURST SIGNAL

(71) Applicant: Nokia Solutions and Networks Oy, Espoo (FI)

(72) Inventors: Michiel Verplaetse, Nazareth (BE); Yannick Lefevre, Heverlee (BE); Wouter Lanneer, Antwerp (BE)

(73) Assignee: Nokia Solutions and Networks Oy, Espoo (FI)

( * ) Notice: Subject to any disclaimer, the term of this patent is extended or adjusted under 35 U.S.C. 154(b) by 324 days.

(21) Appl. No.: 18/477,999

(22) Filed: Sep. 29, 2023

(65) Prior Publication Data

US 2024/0113790 A1 Apr. 4, 2024

(30) Foreign Application Priority Data

Sep. 30, 2022 (EP) .................................... 22199277

(51) Int. Cl.
*H04B 10/61* (2013.01)
*H04Q 11/00* (2006.01)

(52) U.S. Cl.
CPC ....... *H04B 10/616* (2013.01); *H04Q 11/0067* (2013.01)

(58) Field of Classification Search
CPC ........................................... H04B 10/66–6973
See application file for complete search history.

(56) References Cited

U.S. PATENT DOCUMENTS

| | | | | |
|---|---|---|---|---|
| 12,035,083 | B1 * | 7/2024 | Jia | H04B 10/40 |
| 2005/0019042 | A1 * | 1/2005 | Kaneda | H04L 25/03057 398/208 |
| 2008/0166124 | A1 * | 7/2008 | Soto | H04L 25/4904 398/63 |
| 2018/0097139 | A1 * | 4/2018 | Li | H04B 10/6911 |
| 2020/0366536 | A1 * | 11/2020 | Kang | H04L 1/20 |

OTHER PUBLICATIONS

European Search Report for European Application No. 22199277.9 dated Mar. 9, 2023.

* cited by examiner

*Primary Examiner* — Nathan M Cors
(74) *Attorney, Agent, or Firm* — Harness, Dickey & Pierce, P.L.C.

(57) ABSTRACT

In one embodiment, the apparatus includes at least one memory configured to store instructions; and at least one processor configured to execute the instructions and cause the apparatus to perform, receiving, by a receiver in an Optical Line Terminal, OLT, a burst of an upstream signal transmitted in burst mode, adjusting settings for an analog signal conditioning of the received upstream signal; performing the analog signal conditioning of the received upstream signal based on the adjusted settings such that a first compensated signal is provided, obtaining coefficient(s) for a digital signal conditioning of the first compensated signal; performing the digital signal conditioning of the first compensated signal based on the obtained coefficient(s) such that a second compensated signal is provided.

14 Claims, 5 Drawing Sheets

METHOD AND APPARATUS FOR SIGNAL CONDITIONING OF BURST SIGNAL

CROSS-REFERENCE TO RELATED APPLICATIONS

This application claims priority to and the benefit of European Patent Application No. 22199277.9 filed on Sep. 30, 2022, the entire contents of each of which are incorporated herein by reference.

FIELD OF THE INVENTION

Various example embodiments relate to an apparatus and a method for signal conditioning of an optical burst signal.

BACKGROUND

Passive optical networks (PONs) have a point-to-multipoint (P2MP) topology. Multiple optical network units (ONUs) connected to the same Optical Line Terminal (OLT) may use burst mode (BM) operation to transmit upstream (US) signals.

Burst signal typically comprises a preamble during which the receiver may adjust/train itself to the incoming burst. To maximize the throughput of the US PON system, the preamble time (and hence training time) should be minimized.

To close the optical budget at 50G non-return zero (NRZ) communication, any practical implementation of this system will require extensive equalization of the signal. Compared to previous generations of burst-mode PON systems, it is the first time that equalization will be required, and hence new receiver architectures are needed with increased challenges to keep the burst mode settling time within reasonable limits.

SUMMARY OF THE INVENTION

Thus, an objective of the invention is to provide signal conditioning on the signal generated by the analogue front-end system to allow equalization.

The object of the invention is achieved by the subject matters according to the claims.

According to a first aspect of the present invention, there is provided an apparatus, comprising means for: receiving, by a receiver in an Optical Line Terminal, OLT, a burst of an upstream signal transmitted in burst mode, adjusting settings for an analog signal conditioning of the received upstream signal; performing the analog signal conditioning of the received upstream signal based on the adjusted settings, thereby providing a first compensated signal, obtaining coefficient(s) for a digital signal conditioning of the first compensated signal; performing the digital signal conditioning of the first compensated signal based on the obtained coefficient(s), thereby providing a second compensated signal.

According to a second aspect of the present invention, there is provided a method comprising: receiving, by a receiver in an Optical Line Terminal, OLT, a burst of an upstream signal transmitted in burst mode, adjusting settings for an analog signal conditioning of the received upstream signal; performing the analog signal conditioning of the received upstream signal based on the adjusted settings, thereby providing a first compensated signal, obtaining coefficient(s) for a digital signal conditioning of the first compensated signal; performing the digital signal conditioning of the first compensated signal based on the obtained coefficient(s), thereby providing a second compensated signal.

According to a third aspect of the present invention, there is provided a computer program comprising instructions, which, when executed by an apparatus, cause the apparatus to: receive, by a receiver in an Optical Line Terminal, OLT, a burst of an upstream signal transmitted in burst mode; adjust settings for an analog signal conditioning of the received upstream signal; perform the analog signal conditioning of the received upstream signal based on the adjusted settings, thereby providing a first compensated signal, obtain coefficient(s) for a digital signal conditioning of the first compensated signal; perform the digital signal conditioning of the first compensated signal based on the obtained coefficient(s), thereby providing a second compensated signal.

According to a fourth aspect of the invention, there is provided an apparatus comprising at least one processor and at least one memory including computer program code, the at least one memory and the computer program code configured to with the at least one processor, cause the apparatus at least to perform: receiving, by a receiver in an Optical Line Terminal, OLT, a burst of an upstream signal transmitted in burst mode, adjusting settings for an analog signal conditioning of the received upstream signal; performing the analog signal conditioning of the received upstream signal based on the adjusted settings, thereby providing a first compensated signal, obtaining coefficient(s) for a digital signal conditioning of the first compensated signal; performing the digital signal conditioning of the first compensated signal based on the obtained coefficient(s), thereby providing a second compensated signal.

According to a fifth aspect of the invention, there is provided a non-transitory computer readable medium comprising program instructions for causing an apparatus to perform at least the following: receiving, by a receiver in an Optical Line Terminal, OLT, a burst of an upstream signal transmitted in burst mode, adjusting settings for an analog signal conditioning of the received upstream signal; performing the analog signal conditioning of the received upstream signal based on the adjusted settings, thereby providing a first compensated signal, obtaining coefficient(s) for a digital signal conditioning of the first compensated signal; performing the digital signal conditioning of the first compensated signal based on the obtained coefficient(s), thereby providing a second compensated signal.

According to a sixth aspect of the invention, there is provided a computer readable medium comprising program instructions for causing an apparatus to perform at least the following: receiving, by a receiver in an Optical Line Terminal, OLT, a burst of an upstream signal transmitted in burst mode, adjusting settings for an analog signal conditioning of the received upstream signal; performing the analog signal conditioning of the received upstream signal based on the adjusted settings, thereby providing a first compensated signal, obtaining coefficient(s) for a digital signal conditioning of the first compensated signal; performing the digital signal conditioning of the first compensated signal based on the obtained coefficient(s), thereby providing a second compensated signal.

According to the present invention, the accuracy of the signal conditioning is improved while the burst mode settling time and/or power penalty is kept within reasonable limits. Linear reception is provided without adversely affecting the throughput of the PON system.

DETAILED DESCRIPTION

Figure 1:
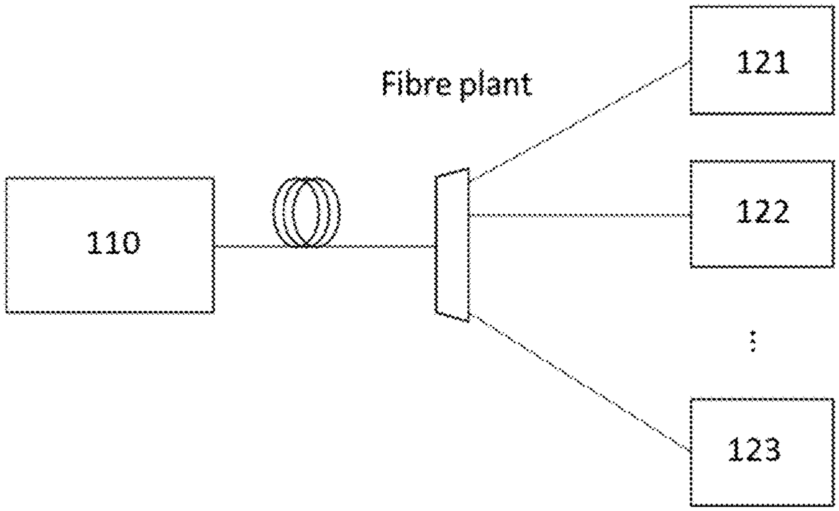
FIG. 1 depicts a schematic block diagram of a PON network topology according to the present application.

Example embodiments of the present application are described herein in detail and shown by way of example in the drawings. It should be understood that, although specific embodiments are discussed herein there is no intent to limit the scope of the invention to such embodiments. To the contrary, it should be understood that the embodiments discussed herein are for illustrative purposes, and that modified and alternative embodiments may be implemented without departing from the scope of the invention as defined in the claims. Embodiments not falling under the scope of the appended claims are to be considered merely as examples suitable for understanding the invention. The sequence of method steps is not limited to the specific embodiments, the method steps may be performed in other possible sequences. Similarly, specific structural and functional details disclosed herein are merely representative for purposes of describing the embodiments. The invention described herein, however, may be embodied in many alternate forms and should not be construed as limited to only the embodiments set forth herein.

FIG. 1 shows a schematic block diagram of a network topology according to the present application.

As shown in FIG. 1 in a PON, an OLT 110 at the network side is used to connect to a plurality of optical network units (ONUs) 121, 122, . . . , 123 at the user side by means of an optical distribution network (ODN) or fiber plant that contains optical fibers and splitters, but no active components.

Most PON technologies such as G-PON, E-PON, and XGS-PON are time-division multiplexing (TDM) PON technologies, in which the fiber medium is shared in time between the different ONUs. In addition, time- and wavelength-division multiplexing (TWDM) PON technologies exist, such as NG-PON2, in which multiple TDM systems at different wavelength are stacked on the same PON system. The present invention applies to both TDM and TWDM PON systems.

In the downstream direction, the OLT simultaneously broadcasts the downstream signal to multiple ONUs over a shared optical distribution network on the specified downstream wavelength(s). Upstream communication from the various ONUs to the optical line terminal (OLT) is achieved via burst mode time-division multiple access on the specified upstream wavelength(s), which are different from the downstream wavelength. More specifically, each ONU transmits bursts in the upstream (US) direction upon explicit request by the OLT and remains silent, disabling the transmitter, in between bursts.

Figure 2:
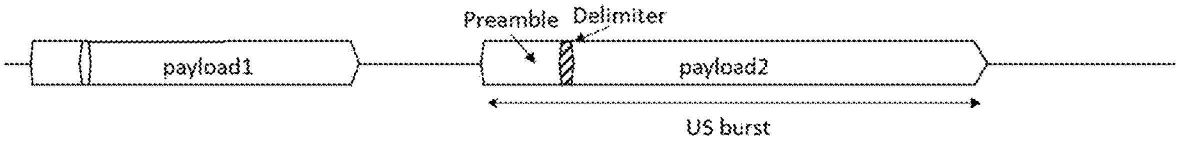
FIG. 2 depicts a schematic block diagram of the content in an upstream burst.

FIG. 2 shows a schematic block diagram of the content in an upstream burst.

As shown in FIG. 2, for upstream (US) transmission, a burst typically consists of: a preamble, a delimiter and data payload. The preamble corresponds to a known bit pattern. During the reception of the preamble, the receiver can adjust/train itself to the incoming burst. The delimiter is a short, known bit pattern that is used to indicate the end of the pre-amble and the beginning of data. Data payload part of the burst contains the actual data bits as well as possibly control signals to be transmitted. The data is typically protected by forward error correction and is organized in FEC codewords.

Figure 3:
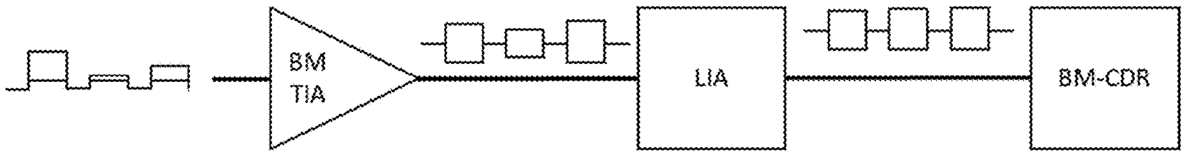
FIG. 3 depicts a schematic block diagram of an example burst-mode signal processing carried out at a receiver according to state of the art.

FIG. 3 shows a schematic block diagram of an example burst-mode signal processing carried out at a receiver according to state of the art.

In a BM PON system, the received optical power of bursts may vary up to typically 20 dB. This is a large variation that should be dealt with at the receiver. The adjustment dealing with the power variation takes place for example during the reception of the preamble.

Specifically, as shown in the example in FIG. 3, the received signal has a signal swing that varies substantially. An example component dealing with this variation is the trans-impedance amplifier TIA, which converts the photo-current generated by the photo-diode on which the optical signal impinges, into an electrical voltage. The TIA adapts its gain based on the received optical power using adaptive gain control (AGC), and tries to level its output as much as possible, i.e., perform signal swing conditioning to try to maintain the same signal swing at its output. As shown in FIG. 3, the output of the TIA may have a reduced variation in the signal swing as comparing to the input signal. However, due to the limited accuracy of the signal swing conditioning of the TIA, the signal swing of the output signal of the TIA may still exhibit significant residual variation.

The received signal may alternatively or additionally have a varying DC offset. The TIA may also set a correct DC offset to compensate for the offset in the incoming burst to remove any DC offsets that might be present at the input, i.e., apply signal offset conditioning to ensure that its output voltage is balanced such that is on average zero during the bursts and optionally in between bursts. Similar as the compensation for signal swing, the offset in the received signal may not be completely compensated by the TIA either. Namely, the output of the TIA may still have residual DC offset remaining.

To deal with the residual of signal swing variation and improve the signal quality, as shown in the example in FIG. 3, the TIA front-end is followed by a limiting amplifier (LIA), for example, as in the previous generation of PON systems (up to 25G NRZ). The LIA may further compensate the residual signal swing variation, by amplifying the signal into saturation to a maximal swing. The LIA applies a nonlinear amplification. Additionally, the residual DC offset may also be further compensated by the LIA. Due to the presence of the LIA, following the TIA, the accuracy of the signal swing conditioning in the TIA can be relaxed significantly.

Further, as shown in the example in FIG. 3, after the processing of the LIA, the variation in the signal swing of the output signal of the LIA is reduced to an acceptable level or removed completely. Seen from the FIG. 3, the signal swing of the output signal of the LIA is constant. Then, the receiver may lock on the clock of the incoming burst, for example using a burst mode clock and data recovery (BM-CDR) module.

However, for 50G US it will no longer be possible to include a LIA, as equalization will be required to compensate bandwidth-limited reception and/or transmission, as well as chromatic dispersion. To be able to perform this equalization, linear reception is required. Generally, for any system employing equalization or multi-level modulation, such as 4 level Pulse Amplitude modulation (PAM4), linear reception is required. This implies that a linear TIA (without LIA) has to fully compensate the possibly 20 dB receive power variation. In practice however, the accuracy of the signal swing conditioning is limited, seen also from FIG. 3. If the signal swing and signal offset cannot be sufficiently compensated, for example to a desired level, it may have significant impact on the BM system performance, and in particular of the performance of the digital signal processing (DSP) of which several parts may be dependent on a non-zero offset and to a deviation of the scaling or gain applied to the signal (i.e., of the signal having a wrong swing).

For example, the signal-to-noise ratio (SNR) and linearity of an analog digital converter (ADC) is gain/offset dependent. Optimal slicer levels are dependent on the offset and gain for higher-order modulations such as 4 level Pulse Amplitude modulation. For NRZ, the optimal slicer level is generally offset-dependent, and/or only gain-dependent in case of unequal noise power for the 0 and 1 levels.

Furthermore, equalizer performance is gain sensitive for certain equalizer types, e.g., for decision-feedback equalizer (DFE) or maximum likelihood sequence estimation (MLSE). In addition, calculation of log-likelihood ratio's (llrs) necessary for soft-input forward error correction (FEC), for instance using low-density parity check (LDPC) codes, may be impacted by gain variations Besides, typical equalizer training methods are typically gain and/or offset sensitive, like e.g. the least mean squares (LMS) algorithm or variants thereof. These algorithms include a step-size control parameter that determines the convergence rate, and may expect a fixed signal swing without any signal offset. A lower gain than expected will yield slower equalizer convergence rate and hence too long training overhead. Higher gains than expected might even result in algorithmic instability.

To mitigate the impact of the problems due to inaccurate offset/swing conditioning in legacy burst-mode TIAs, accurate swing and offset conditioning will have to be applied in the system.

Straight forwardly, an accurate analog swing and offset conditioning systems may be implemented in a burst-mode TIA. However, it will have some practical limitations, for example, achieving a better accuracy requires a longer settling time and thus a longer preamble, which adversely affects the throughput of the PON system.

Figure 4:
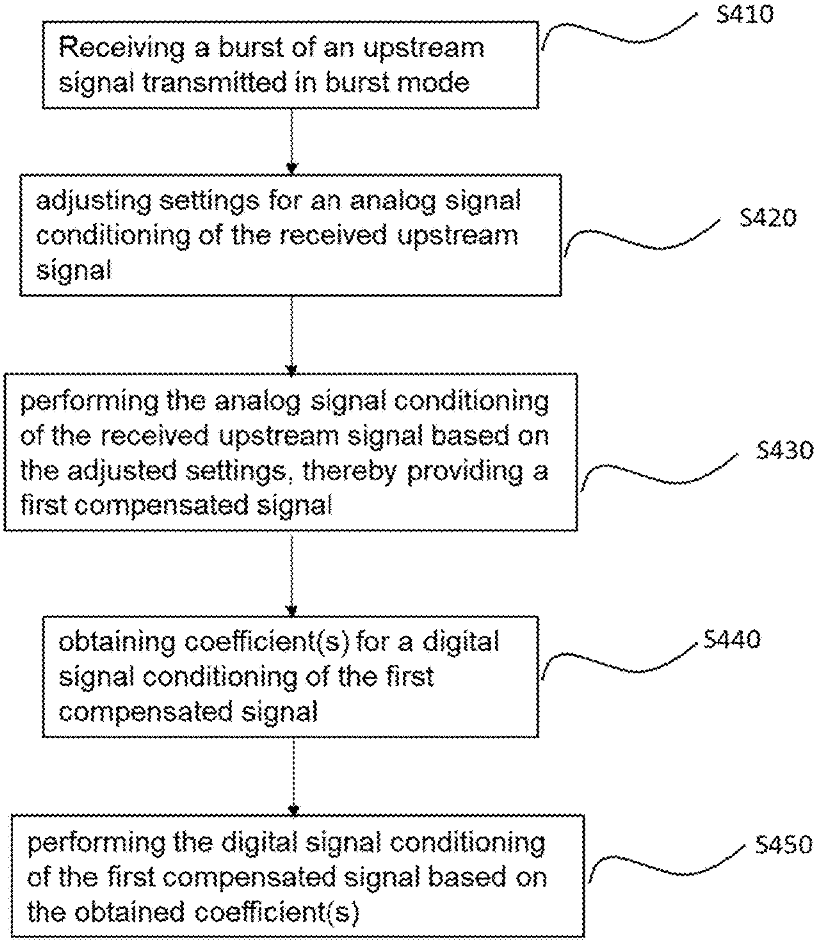
FIG. 4 depicts a flow diagram of a method for a signal conditioning according to various embodiments.

FIG. 4 shows a flow diagram of a method for a signal conditioning according to various embodiments.

Various aspects may be implemented in a receiver in an OLT, for example the OLT 110. Alternatively, various aspects may be implemented in an electronic device communicatively connected to the receiver in the OLT.

Specifically, as shown in FIG. 4, in step S410, the receiver receives a burst of an upstream signal transmitted in burst mode.

Figure 5:
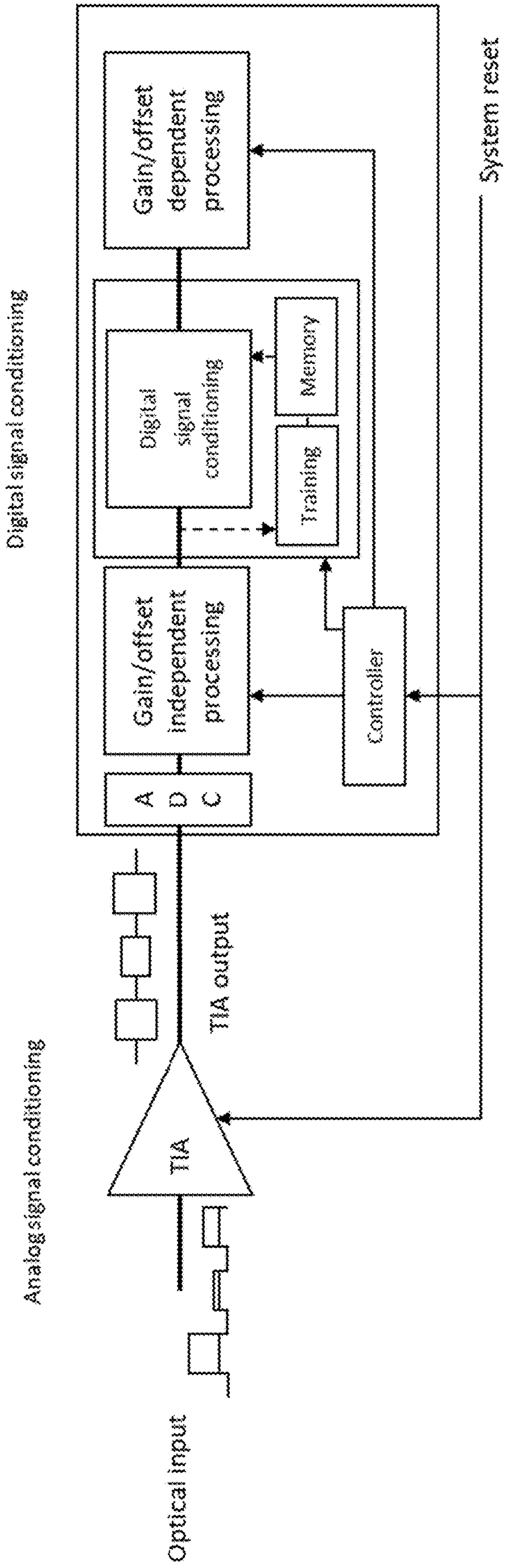
FIG. 5 depicts a schematic block diagram of an example implementation of the signal conditioning according to an embodiment.

FIG. 5 shows a schematic block diagram of an example implementation of the signal conditioning according to an embodiment.

As shown in FIG. 5, the swing of the received optical signal varies substantially, since the received optical power of bursts may vary up to typically 20 dB. The received optical signal may additionally or alternatively have a DC offset, which causes the average voltage of the received signal to deviate from zero.

Referring back to FIG. 4, in step S420, the receiver adjusts settings for an analog signal conditioning of the received upstream signal.

Specifically, the analog signal conditioning may comprise at least one of: signal swing conditioning, and signal offset conditioning.

More specifically, signal swing conditioning may comprise applying a gain to compensate the variation in signal swing, and signal offset conditioning may comprise offset compensation.

The settings that may be adjusted may comprise for example settings related to signal swing, such as analog adaptive gain control. The settings that are adjusted may alternatively or additionally comprise for example settings related to signal offset, such as analog offset compensation. The adjustment of the settings may have various forms, for example the settings related to signal offset may be adjusted, based on the offset in the received signal, by driving a current through a load or by charging a capacitance.

In step S430, the receiver performs the analog signal conditioning of the received upstream signal based on the adjusted settings, thereby providing a first compensated signal.

In the example shown in FIG. 5, a TIA is used for the purpose of the analog signal conditioning of the received upstream signal. TIA may handle the impact of the large dynamic range of the optical input and reduce the dynamic range and offset variation in the TIA output signal within reasonable limits for the analog digital converter (ADC) input. However, the TIA may not be able to reduce the dynamic range of the TIA output signal completely. As can be seen from FIG. 5, the TIA output may still have some residual variation in the signal swing. The TIA output may be provided to an ADC, which converts analog signal into digital signal.

In some embodiments, the receiver may obtain a timing information related to the receiving time of the burst and coordinate the adjusting, the performing of the analog signal conditioning based on the timing information.

Specifically, the timing information may be obtained from a reset signal. Alternatively, the timing information may be obtained from a signal detection circuitry.

In some embodiments, the receiver may initialize the adjusting based on the timing information.

In the example shown in FIG. 5, the TIA is initialized upon receiving a system reset signal. The reset signal may be an internal system reset signal within the OLT 110. The OLT 110 may assign time slots for the upstream burst from each ONU 121, 122 and 123. The OLT 110 may transmit the assigned time slots to each ONU 121, 122 and 123. Each ONU 121, 122 and 123 may transmit upstream burst according to the assigned time slots. The OLT may determine the receiving time of the burst from each ONU 121, 122 and 123 according to the time slot it has assigned to the respective ONU 121, 122 and 123. The internal system reset signal may be generated by the OLT 110 based on the time slot, that it has assigned to the respective ONU 121, 122 and 123. In another example, the system reset signal to the TIA may also be generated by the controller.

Figure 6:
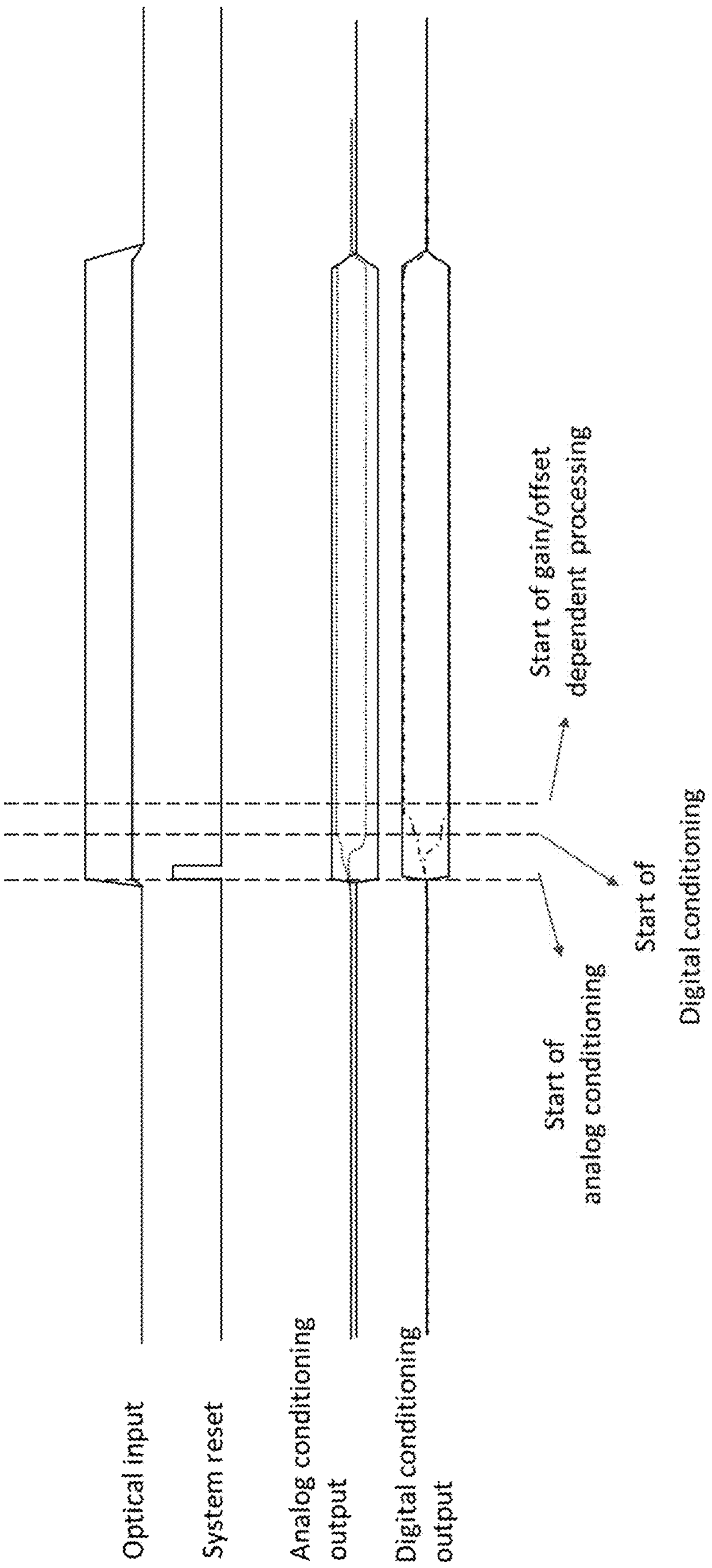
FIG. 6 depicts a schematic timing diagram according to the example embodiment shown in FIG. 5.

FIG. 6 shows a schematic timing diagram according to the example embodiment shown in FIG. 5.

Specifically, in the example shown in FIG. 6, the adjusting may be started upon receiving a system reset signal. The analog signal conditioning of the received upstream signal may be performed while the settings are being adjusted. In another example, the analog signal conditioning may be started after a first time duration after the system reset signal. Similarly, the adjusting may be started after a second time duration after the system reset signal. The second time duration may be smaller than, equal to, or bigger than the first time duration.

Referring back to FIG. 4, in step S440, the receiver obtains coefficient(s) for a digital signal conditioning of the first compensated signal.

In step S450, the receiver performs the digital signal conditioning of the first compensated signal based on the obtained coefficient(s), thereby providing a second compensated signal.

Specifically, although step S440 is shown as being performed after step S430, a skilled person shall understand, the sequence of the steps is not limited to the given example. The receiver may also coordinate the obtaining of the coefficient(s), and the performing of the digital signal conditioning based on the timing information. In some embodiments, the receiver may initialize the obtaining of the coefficient(s) based on the timing information.

Specifically, in one example, the receiver may initialize the obtaining of the coefficient(s) upon receiving the system reset signal. The coefficient(s) for the digital signal conditioning may be pre-trained for example based on a previous burst of the ONU. The coefficient(s) for the digital signal conditioning may be stored in a memory after being trained. The receiver may obtain the coefficient(s) for the digital signal conditioning by loading pre-trained coefficient(s).

In another embodiment, the receiver may determine whether the adjusting is completed. Based on determining that the adjusting is completed, the receiver may initialize the obtaining of the coefficient(s).

Specifically, the receiver may determine whether the adjusting is completed based on the timing information and a predetermined duration related to time required for the adjusting.

Referring to FIG. 6, in both analog conditioning output and the digital conditioning output, solid lines are used to represent the expected signal swing of the respective compensated signal. Dotted lines are used to represent the actual signal swing of the analog conditioning output. For example, when the TIA has a maximum gain limitation, a soft burst will have a reduced output signal, as shown by the dotted lines in FIG. 6. Furthermore, it can also be seen from FIG. 6, that the output of the analog conditioning also has residual offset. While the dashdotted lines are used to represent the actual signal swing of the digital conditioning output.

Specifically, as can be seen from FIG. 6, starting from the beginning of the burst signal, the signal swing of the output of the analog conditioning may be stable after a predetermined duration. The predetermined duration is related to the time required for the adjusting, and may be estimated as analog settling time of the TIA. The adjusting of the settings for the analog conditioning may be considered as being completed after the predetermined duration. After the predetermined duration after the start of the burst, the analog conditioning output may be considered as the first compensated signal. The receiver may start the obtaining of the coefficient(s) for the digital signal conditioning after the predetermined duration after the start of the burst.

Alternatively, the receiver may determine whether the adjusting is completed based on a signal detection circuitry.

Specifically, a signal detection circuitry may be configured to determine whether the signal swing of the output of the analog conditioning is stabilized. The signal detection circuitry may determine that the adjusting is completed when the signal swing of the output of the analog conditioning is stabilized. After the signal detection circuitry determines that the adjusting is completed, the analog conditioning output may be considered as the first compensated signal. The receiver may start the obtaining of the coefficient(s) for the digital signal conditioning after the signal detection circuitry determines that the adjusting is completed.

Furthermore, reference is made to FIGS. 5 and 6, after it is determined that the adjusting is completed, the controller may optionally initialize processing that is not dependent on the signal gain and/or offset based on the digitalized first compensated signal. Examples of gain and/or offset-independent processing functions may be bang-bang CDR circuitry, fixed feed-forward equalizers (FFE), or Continuous Time Linear Equalizers (CTLEs), etc.

In some embodiments, the receiver may obtain the coefficient(s) for the digital signal conditioning by training based on the first compensated signal.

Specifically, in the examples shown in FIGS. 5 and 6, after it is determined that the adjusting of the settings for the analog conditioning is completed, as described above, the controller in FIG. 5 may initialize the training of the coefficient(s) for the digital signal conditioning. In the example shown in FIG. 5, the training may be carried out based on the signal after gain and/or offset independent processing. Alternatively, the training may the carried out based on the digitalized first compensated signal.

Specifically, the coefficient(s) for the digital signal conditioning may be trained using different methods. For signal swing conditioning, a gain coefficient may be obtained based on a peak or Root Mean Squared (RMS) power detector or by loading a gain coefficient from a memory. Similarly, for signal offset conditioning, offset coefficient may be obtained by performing an offset estimation.

Specifically, the digital signal conditioning may comprise at least one of: signal swing conditioning, and signal offset conditioning. A skilled person should understand, that the tasks performed by the digital signal conditioning can also applied by the analog signal conditioning. The analog signal conditioning may comprise more tasks than the digital signal conditioning. For example, when the digital signal conditioning comprises signal swing conditioning, the analog signal conditioning comprises signal swing conditioning as well. In another example, when the analog signal conditioning comprises both signal swing conditioning and signal offset conditioning, the digital signal conditioning may comprise only signal swing conditioning the or both signal swing conditioning and signal offset conditioning as well.

The digital signal conditioning comprising the signal swing conditioning may be done in different ways, for example, by explicit gain scaling of the digital signal, i.e., multiplication of the digital signal with a gain coefficient. Alternatively, the gain scaling can be incorporated in other DSP function, for instance by scaling the equalizer coefficients, e.g., by scaling all the coefficients of a FFE or DFE with the same gain coefficient), by scaling the slicer coefficients in case of multi-level signals like PAM4, or by scaling the LLR calculation parameters.

The digital signal conditioning comprising the signal offset conditioning may be done in different ways, for example, by applying an explicit offset coefficient to the digital signal, e.g., through addition with a given offset coefficient, and/or by incorporating an offset coefficient into the equalizer, or by shifting of all the slicer values by an offset coefficient in case of multi-level signals like PAM4.

As indicated in FIG. 5, the coefficient(s) for the digital signal conditioning determined during the training may be stored in a memory. Then the digital signal conditioning may be performed based on the trained coefficient(s) loaded from the memory.

In the example shown in FIG. 6, the digital signal conditioning may be started together with the training of the coefficient(s). Specifically, the digital signal conditioning may be started after it is determined that the adjusting of the settings for the analog conditioning is completed, and the digital signal conditioning may be performed while the coefficient(s) for the digital signal conditioning is(are) being trained. In another example, the digital signal conditioning may be started after the training is completed. In yet another example, the digital signal conditioning may be started based on the timing information. For example, the digital signal conditioning may be started together with the analog signal conditioning, upon receiving the system reset signal. In this case, the coefficient(s) for the digital signal conditioning may be pre-trained and loaded from a memory.

Optionally the digital signal conditioning may be implemented after the CDR block. It allows performing the digital signal conditioning only on the relevant samples that are used for further processing.

The digital signal conditioning may be implemented using a digital variable-gain amplifier (VGA) which has no small signal gain limitations compared to analog circuits VGAs. Thus, in FIG. 6 the signal swing of the output of the digital signal conditioning may eventually achieve the desired level. In the example shown in FIG. 6, the output of digital signal conditioning may be considered as the second compensated signal after the training is completed. As can be seen from FIG. 6, the residual variation in the signal swing and the residual DC offset in the analog conditioning output is further compensated in the second compensated signal.

The receiver may perform decoding based on the second compensated signal.

Specifically, in the example shown in FIG. 5, the controller may determine whether the training is completed for example based on a predetermined duration related to time required for the training, or based on observed error criterions. After the controller determines that the training is completed, the controller may initialize the gain/offset dependent processing. Examples of gain and offset dependent processing blocks are non-linear equalizers (DFE), MLSE, soft-LDPC, PAM-4 slicer, equalizer training and slicer training etc. Generally, the second compensated signal is further used as basis for decoding.

According to various embodiments, the combination of the analog signal conditioning and the digital signal conditioning has several benefits:

More complex gain/offset independent processing can help to improve signal quality to train more accurate coefficients for the digital signal conditioning.

Optionally training the coefficients for the digital signal conditioning on the signal after the CDR allows to train only on a minimal amount of samples that are used for further processing.

A digital VGA, which can be used to perform digital swing conditioning, has no small signal gain limitations in contrast to analog VGAs which have such limitations.

Adaptive digital offset compensation can be used to counteract wander in the signal when AC-coupling has to be used between TIA and ADC.

Coefficient(s) loaded from memories can be used to speed up the digital signal conditioning.

Figure 7:
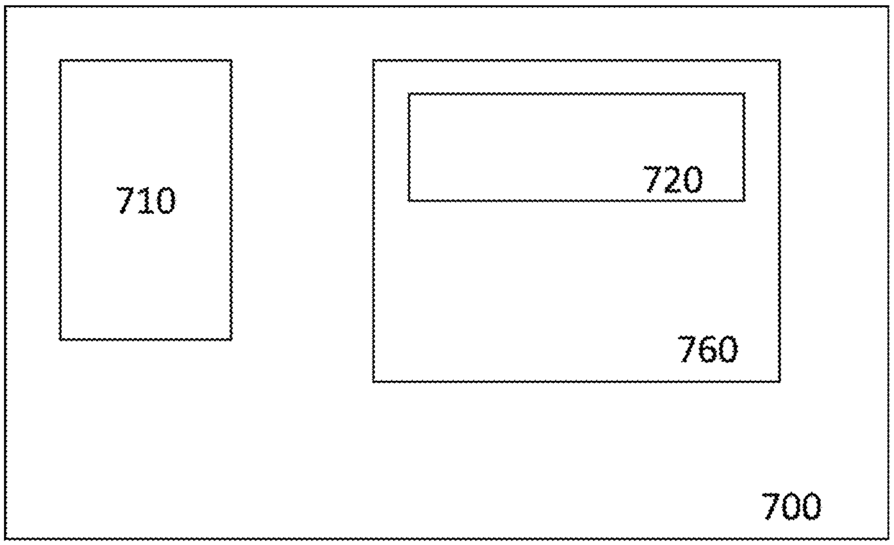
FIG. 7 depicts a block diagram of an apparatus according to various embodiments.

FIG. 7 shows a block diagram of an apparatus according to various embodiments.

Specifically, FIG. 7 depicts the apparatus 700 operating in accordance with an example embodiment of the invention. The apparatus 700 may be, for example, a receiver in an OLT 110 or an electronic device communicatively connected to the receiver in the OLT 110. The apparatus 700 includes a processor 710 and a memory 760. In other examples, the apparatus 700 may comprise multiple processors.

In the example of FIG. 7, the processor 710 is a control unit operatively connected to read from and write to the memory 760. The processor 710 may also be configured to receive control signals received via an input interface and/or the processor 710 may be configured to output control signals via an output interface. In an example embodiment, the processor 710 may be configured to convert the received control signals into appropriate commands for controlling functionalities of the apparatus 700.

The memory 760 stores computer program instructions 720 which when loaded into the processor 710 control the operation of the apparatus 700 as explained above. In other examples, the apparatus 700 may comprise more than one memory 760 or different kinds of storage devices.

Computer program instructions 720 for enabling implementations of example embodiments of the invention or a part of such computer program instructions may be loaded onto the apparatus 700 by the manufacturer of the apparatus 700, by a user of the apparatus 700, or by the apparatus 700 itself based on a download program, or the instructions can be pushed to the apparatus 700 by an external device. The computer program instructions may arrive at the apparatus 700 via an electromagnetic carrier signal or be copied from a physical entity such as a computer program product, a memory device or a record medium such as a Compact Disc (CD), a Compact Disc Read-Only Memory (CD-ROM), a Digital Versatile Disk (DVD) or a Blu-ray disk.

According to an example embodiment, the apparatus 700 comprises means for performing, wherein the means for performing comprises at least one processor 710, at least one memory 760 including computer program code 720, the at least one memory 760 and the computer program code 720 configured to, with the at least one processor 710, cause the performance of the apparatus 700.

Embodiments of the present invention may be implemented in software, hardware, application logic or a combination of software, hardware and application logic. The software, application logic and/or hardware may reside on the apparatus, a separate device or a plurality of devices. If desired, part of the software, application logic and/or hardware may reside on the apparatus, part of the software, application logic and/or hardware may reside on a separate device, and part of the software, application logic and/or hardware may reside on a plurality of devices. In an example embodiment, the application logic, software or an instruction set is maintained on any one of various conventional computer-readable media. In the context of this document, a 'computer-readable medium' may be any media or means that can contain, store, communicate, propagate or transport the instructions for use by or in connection with an instruction execution system, apparatus, or device, such as a computer, with one example of a computer described and depicted in FIG. 7. A computer-readable medium may comprise a computer-readable storage medium that may be any media or means that can contain or store the instructions for use by or in connection with an instruction execution system, apparatus, or device, such as a computer.

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It will be obvious to a person skilled in the art that, as the technology advances, the inventive concept can be implemented in various ways. The invention and its embodiments are not limited to the examples described above but may vary within the scope of the claims.

The invention claimed is:

1. An apparatus, comprising:

at least one memory configured to store instructions; and at least one processor configured to execute the instructions and cause the apparatus to perform, obtaining a timing information related to a receiving time of a burst of an upstream signal transmitted in burst mode;

receiving, by a receiver in an Optical Line Terminal, OLT, the burst of the upstream signal transmitted in burst mode; and coordinating, based on the timing information, signal processing, the signal processing including, adjusting settings for an analog signal conditioning of the received upstream signal, performing the analog signal conditioning of the received upstream signal based on the adjusted settings such that a first compensated signal is provided, obtaining at least one coefficient for a digital signal conditioning of the first compensated signal, and performing the digital signal conditioning of the first compensated signal based on the obtained at least one coefficient such that a second compensated signal is provided.

2. The apparatus of claim 1, wherein the analog and the digital signal conditioning comprises at least one of:

signal swing conditioning, and signal offset conditioning.

3. The apparatus of claim 1, wherein the timing information is obtained from a reset signal.

4. The apparatus of claim 1, wherein the timing information is obtained from a signal detection circuitry.

5. The apparatus of claim 1, wherein the apparatus is further caused to perform:

initializing the adjusting based on the timing information.

6. The apparatus of claim 1, wherein the apparatus is further caused to perform:

initializing the obtaining of the at least one coefficient based on the timing information.

7. The apparatus of claim 1, wherein the apparatus is further caused to perform:

determining whether the adjusting is completed;

based on determining that the adjusting is completed, initializing the obtaining of the at least one coefficient.

8. The apparatus of claim 7, wherein the apparatus is further caused to perform:

determining whether the adjusting is completed based on the timing information and a duration related to time required for the adjusting.

9. The apparatus of claim 7, wherein the apparatus is further caused to perform:

determining whether the adjusting is completed based on a signal detection circuitry.

10. The apparatus of claim 1, wherein the apparatus is further caused to perform:

obtaining the at least one coefficient for the digital signal conditioning by training based on the first compensated signal.

11. The apparatus of claim 1, wherein the apparatus is further caused to perform:

obtaining the at least one coefficient for the digital signal conditioning by loading pre-trained coefficient(s).

12. The apparatus of claim 1, wherein the apparatus is further caused to perform:

performing decoding based on the second compensated signal.

13. A method, comprising:

obtaining a timing information related to a receiving time of a burst of an upstream signal transmitted in burst mode;

receiving, by a receiver in an Optical Line Terminal, OLT, the burst of the upstream signal transmitted in burst mode; and coordinating, based on the timing information, signal processing, the signal processing including, adjusting settings for an analog signal conditioning of the received upstream signal, performing the analog signal conditioning of the received upstream signal based on the adjusted settings such that a first compensated signal is provided, obtaining coefficient(s) for a digital signal conditioning of the first compensated signal, and performing the digital signal conditioning of the first compensated signal based on the obtained coefficient(s) such that a second compensated signal is provided.

14. A non-transitory computer-readable medium storing instructions, which when executed by a processor, cause an apparatus including the processor to:

obtain a timing information related to a receiving time of a burst of an upstream signal transmitted in burst mode;

receive, by a receiver in an Optical Line Terminal, OLT, the burst of the upstream signal transmitted in burst mode; and coordinating, based on the timing information, signal processing, the signal processing including, adjust settings for an analog signal conditioning of the received upstream signal, perform the analog signal conditioning of the received upstream signal based on the adjusted settings such that a first compensated signal is provided, obtain coefficient(s) for a digital signal conditioning of the first compensated signal, and perform the digital signal conditioning of the first compensated signal based on the obtained coefficient(s) such that a second compensated signal is provided.

* * * * *